US005345491A

United States Patent [19]
Bolk et al.

[11] Patent Number: 5,345,491
[45] Date of Patent: Sep. 6, 1994

[54] X-RAY ANALYSIS APPARATUS AND DETECTOR READING CIRCUIT MEANS SUITABLE FOR APPLICATION IN SUCH AN X-RAY ANALYSIS APPARATUS

[75] Inventors: Hendrick J. J. Bolk; Georges C. P. Zieltjens, both of Almelo, Netherlands

[73] Assignee: U.S. Philips Corporation, New York, N.Y.

[21] Appl. No.: 53,943

[22] Filed: Apr. 26, 1993

[30] Foreign Application Priority Data

Apr. 28, 1992 [EP] European Pat. Off. ......... 92201177.0

[51] Int. Cl.$^5$ ................................................ A61B 6/00
[52] U.S. Cl. .......................................... 378/70; 378/91; 378/116
[58] Field of Search ............... 378/19, 44, 70, 71, 378/91, 115, 116, 44

[56] References Cited

U.S. PATENT DOCUMENTS

| 4,334,154 | 6/1982 | Sandland | 250/445 T |
| 4,654,531 | 3/1987 | Morris et al. | 250/385 |
| 4,815,118 | 3/1989 | Acharya et al. | 378/19 |
| 4,922,442 | 5/1990 | Bolk et al. | 364/550 |
| 5,012,498 | 4/1991 | Cuzin et al. | 378/19 |

FOREIGN PATENT DOCUMENTS 0288116 10/1988 European Pat. Off. .

Primary Examiner—David P. Porta
Assistant Examiner—Don Wong
Attorney, Agent, or Firm—Jack D. Slobod

[57] ABSTRACT

Pulses generated by an x-ray gas ionisation detector have different temporal forms in dependence of the location in the detector where an x-ray photon interacts with a gas atom. The energy-resolution at count rates amounting to Mcts$^{-1}$ of an x-ray analysis apparatus is improved by employing a resetable pulse-integrator. A resetable integrator is constructed by employing a dual gate field-effect transistor (FET) and a wide-band current feedback operational amplifier. Cross-talk due to parasitic capacitances is reduced by supplying a suitable DC voltage to one of the two gates of the dual gate FET. The gate control is made independent of the output of the integrator.

13 Claims, 1 Drawing Sheet

X-RAY ANALYSIS APPARATUS AND DETECTOR READING CIRCUIT MEANS SUITABLE FOR APPLICATION IN SUCH AN X-RAY ANALYSIS APPARATUS

BACKGROUND OF THE INVENTION

1. Field of the Invention

The invention pertains to an x-ray analysis apparatus comprising an x-ray source, a sample holder and an x-ray detector with detector reading circuit means. The invention also relates to detector reading circuit means for reading signals generated by the x-ray detector.

2. Description of the Related Art

An x-ray analysis apparatus of said kind is described in the European Patent Application EP 0 288 116 which corresponds to U.S. Pat. No. 4,922,442.

In the x-ray analysis apparatus described in the cited reference, detector reading circuit means is provided for discriminating pulse signals as single or multiple integrated pulse signals and recording said single or multiple integrated pulse signals as numbers of pulse signals. Thus, a solution is provided for the problem how to avoid deviations between an actual and a measured number of pulse signals when, at an increasing rate of incidence of x-ray photons in the x-ray detector, integrated pulses are piled up in case x-ray photons enter the x-ray detector substantially simultaneously. In order to obtain accurate measurements, integration of pulses should be performed up to sufficiently large values of pulse amplitudes. Pulse amplitudes of pulse signals generated by the x-ray detector correspond to values of energies of x-ray photons incident in the x-ray detector. Thus for carrying out accurate measurements of x-ray energy distributions, sufficiently high x-ray energies for integration of the pulse signals should be taken into account.

SUMMARY OF THE INVENTION

It is inter alia an object of the invention to provide an x-ray analysis apparatus for reliably and accurately performing x-ray analysis, e.g. x-ray spectrometry or x-ray diffraction, at increasing rate of incidence of x-ray photons in the x-ray detector.

To achieve this, an x-ray analysis apparatus in accordance with the invention is characterised in that said detector reading circuit means comprises resetable signal integration means and a high-bandwidth amplifying means for providing a signal in correspondence with an integral of a signal generated by the x-ray detector.

By reducing measuring dead-time of an integrator in the detector reading circuit means, it can be avoided that integration needs to be performed up to increasingly large values of energies for achieving sufficient accuracy.

A preferred embodiment of an x-ray analysis apparatus in accordance with the invention is characterised in that said resemble integration means comprises an integration capacitor and controllable discharging means connected in parallel and in that the detector reading circuit means comprises signalling means for supplying a control signal for activating said controllable discharging means.

Measuring dead-time of an integrator is determined by the value of a resistance connected in parallel with a integration capacitor. Reducing the measuring dead-time could be achieved by reducing said resistance, thereby reducing the time constant associated with discharging the integration capacitor. However, pulses that are broadened in time are inaccurately integrated when said resistance is reduced, because discharging of the integration capacitor commences before such a broad pulse has been fully integrated. This inaccurate integration is detrimental for a capability of resolving energies of different x-ray photons incident in the x-ray detector. Thus, in order to reduce measuring dead-time and retaining resolving power, an x-ray analysis apparatus in accordance with the invention comprises resemble signal integration means, i.e. having a controllable resistance over which the integration capacitor is discharged. To that end, providing a controllable discharging means, notably a controllable resistance, is achieved by employing circuit means comprising e.g. a field-effect transistor, an opto-coupler transistor, a thyristor or bipolar transistors.

A further preferred embodiment of an x-ray analysis apparatus in accordance with the invention is characterised in that said controllable discharging means comprises a field-effect transistor and in that said signalling means is arranged for supplying a switching signal to a gate of said field-effect transistor.

Providing a controllable resistance is achieved in a particularly simple way by employing a field-effect transistor (FET). A source-to-drain channel of said FET is employed for discharging the integration capacitor and the control signal is supplied to the gate of the FET. Providing a controllable resistance for discharging the integration capacitors is achieved by employing said field-effect transistor having a source and a drain, such that the source-to-drain channel of the transistor is connected in parallel to the integration capacitor, so as to charge the integration capacitor via a resistor supplying an input signal and discharge the integration capacitor over the source-to-drain channel of the transistor, in dependence of the conductance of the source-to-drain-channel as controlled by a gate voltage tendered to a gate of said transistor.

A further preferred embodiment of an x-ray analysis apparatus in accordance with the invention is characterised in that said detector reading circuit means comprises high-frequency de, coupling means for shielding the integration capacitor from said control signal.

In order to avoid perturbations by a high-frequency component of the control signal for activating the integration capacitor, a further capacitance is connected to a gate of the FET for shielding of the integration capacitor from the control signal.

A further preferred embodiment of an x-ray analysis apparatus in accordance with the invention is characterised in that said transistor is a dual gate field-effect transistor and in that the detector reading circuit means comprises a DC voltage supply for applying a voltage to a first gate of the dual gate field-effect transistor for reducing cross-talk between a second gate of the dual gate field-effect transistor and a drain of said dual gate field-effect transistor, and in that said signalling means is arranged for supplying a signal to said second gate of the dual gate field-effect transistor.

Cross-talk induced by parasitic capacitances between the second gate and the drain of the dual gate FET is reduced by applying a suitable voltage with a high-frequency coupling to the first gate of the dual gate FET. In order to provide a resetable signal integration means in accordance with the present embodiment in accordance with the invention the transistor is a dual gate field-effect transistor (FET), having a first and a second gate.

A further preferred embodiment of an x-ray analysis apparatus in accordance with the invention is characterised in that said signalling means comprises a trigger circuit for supplying said switching signal to said second gate in dependence on a signal being generated by the x-ray detector.

Reducing measuring dead-time is performed particularly effectively when the integration means is activated only when a pulse signal is generated by the x-ray detector. This is achieved by means of a trigger circuit for producing control signals from pulse signals generated by the x-ray detector.

A further preferred embodiment of an x-ray analysis apparatus in accordance with the invention is characterised in that said high-bandwidth amplifying means comprises a high-frequency operational amplifier having an inverting input port, a non-inverting input port, an output port and having said integration capacitor connected between said non-inverting input port and a reference potential.

For being able to operate at high count rates (e.g. Mn a range above 1Mct s$^{-1}$), the resetable signal integration means is provided with a wideband amplifying means. In a preferred embodiment said wideband amplifying means consists of a high-frequency operational amplifier having a non-inverting input port whereto the integration capacitor is connected and whereto a pulse signal generated by the x-ray detector is supplied.

A further preferred embodiment of an x-ray analysis apparatus in accordance with the invention is characterised in that said high-bandwidth amplifying means comprises a current feedback operational amplifier having an inverting input port, a non-inverting input port, an output port and having a resistor connected between said inverting input port and said output port and having said integration capacitor connected between said non-inverting input port and a first reference potential and in that said controllable discharge means is connected between said non-inverting input port and a second reference potential.

In the present preferred embodiment said wideband amplifying means consists of a wideband current feedback operational amplifier. For stable operation, current feedback operational amplifiers require that a fixed resistor is connected between an inverting input and an output of the current feedback operational amplifier. Charging of the integration capacitor is performed via a resistor supplying an input signal, notably a pulse signal generated by the x-ray detector. In order to provide a resetable signal integration means comprising a current feedback operational amplifier is achieved in the present embodiment in accordance with the invention by employing a controllable resistance, e.g. a field-effect transistor having its source-to-drain channel connected in parallel to the integration capacitor so as to discharge the integration capacitor in dependence of the conductance of the source-to-drain channel as controlled by a gate voltage tendered to a gate of the field-effect transistor. For reliable operation of the resetable signal integration means at high count rates, the control of the controllable resistance, e.g. a first gate of the FET is made independent of an output signal of the resemble signal integration means. The integration capacitor and the source of the FET are connected to stable reference potentials, for which convenient choices are to connect both the source of the FET and the integration capacitor to a ground potential.

A further preferred embodiment of an x-ray analysis apparatus in accordance with the invention is characterised in that the detector reading circuit means comprises offset adjustment means for adjusting a potential difference between said non-inverting input port and said inverting input port.

Operational amplifiers often show deviations from ideal operation. A particularly frequent deviation consists of a non-intentional potential difference occurring between the non-inverting input port and the inverting input port of the operational amplifier. Such a potential difference causes the signal integration means to produce an error in the output signal of the detector reading circuit. By means of an offset adjustment means for adjusting a non-intentional potential difference between the non-inverting input port and the inverting input port provides for a more accurate output signal to be produced by the detector reading circuit means.

A detector reading circuit means, suitable for accurate operation at high rate of photons incident in the x-ray detector preferably comprises resemble signal integration means and a high-bandwidth amplifying means for providing a signal in correspondence with an integral of a signal generated by the x-ray detector.

These and other aspects of the invention will become opponent from and elucidated with reference to the embodiments described hereinafter and with reference to the accompanying drawing.

DETAILED DESCRIPTION OF THE PREFERRED EMBODIMENT

Figure 1:
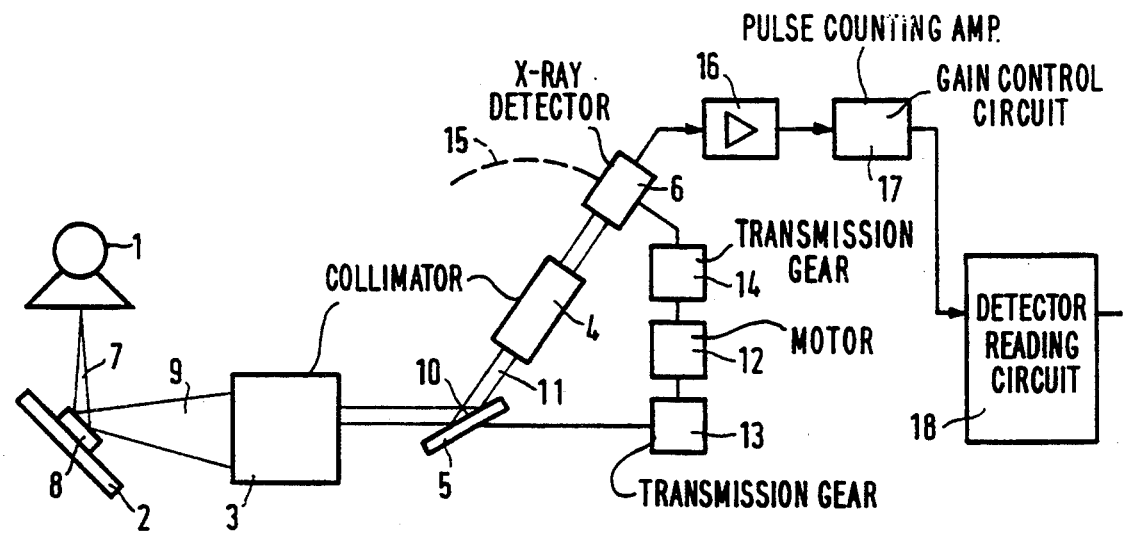
FIG. 1 shows diagrammatically an x-ray analysis apparatus employing detector reading circuit means comprises resemble integration means for reducing measuring dead-time and a high-bandwidth current feedback operational amplifier.

An x-ray analysis apparatus shown in FIG. 1 comprises an x-ray source 1, a sample holder 2, collimators 3 and 4, an analyzing crystal 5 and an x-ray detector 6. Notably, the x-ray detector 6 is a gas ionisation detector. An x-ray beam 7 is incident on a sample 8 and causes x-ray fluorescence to be emitted by the sample. A fluorescence x-ray beam 9 is incident via the collimator 3 on a surface 10 of the analyzing crystal 5, after which a further x-ray beam 11 reflected according to Bragg reflection therefrom reaches the x-ray detector 6 via the collimator 4. By way of a drive motor 12 and a transmission gear 13 the analyzing crystal is at option rotated about an axis perpendicular to the plane of the drawing. By means of this rotation the energy of the x-ray beam incident on the x-ray detector is selected within a narrow range. The motor 12, acting via a transmission gear 14, causes a rotation of the x-ray detector which matches the rotation of the crystal, likewise about an axis at right angles to the plane of the drawing. Due to this rotation, the x-ray detector is moved along an arc of a circle 15. The signal amplitudes generated by the x-ray detector are amplified by a pulse-counting amplifier 16 controlled by a gain control circuit 17. The signal amplitude of a signal generated by the x-ray detector is in correspondence with an energy of an x-ray photon incident on the x-ray detector. The signal from the x-ray detector 6 is further processed by detector reading circuit means 18 comprising resetable signal integration means that will be further discussed hereinafter with reference to FIG. 2. The detector reading circuit means comprises also means for providing a correction signal for adjusting the pulse-counting amplifier by means of the gain control circuit 17.

Figure 2:
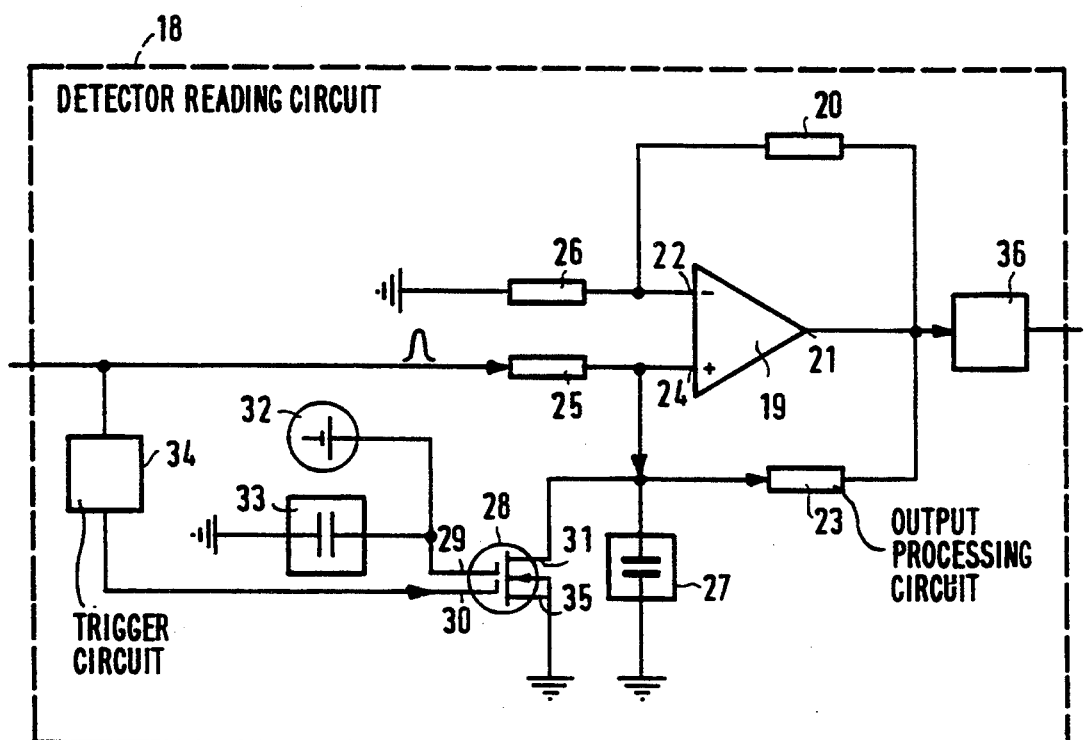
FIG. 2 shows a block circuit diagram of a resemble integration means for reducing measuring dead-time and a high-bandwidth current feedback operational amplifier.

FIG. 2 shows a more detailed block circuit diagram of an embodiment of a detector reading circuit for an x-ray analysis apparatus in accordance with the invention. For stable operation of the high-bandwidth amplifying means in the form of a current feedback operational amplifier 19 a fixed resistance 20 is connected between the output port 21 and the inverting input port 22 of the current feedback operational amplifier. As an example the current feedback operational amplifier preferably has a bandwidth above 100 MHz, a settling time of approximately 10 ns and a slew rate of approximately 500 V/$\mu$s. A further resistor 23 is connected between the output port of the current feedback operational amplifier and the non-inverting input port 24 of the current feedback operational amplifier. A signal generated by the x-ray detector is supplied as an input signal to the detector reading circuit via a resistor 25. For balancing the current feedback operational amplifier the inverting input port 22 is connected via a resistor 26 to a stable reference potential, notably in the embodiment shown, the resistor 26 is connected to ground. For stable operation of the detector reading circuit 18 the resistors 20,23,25 and 26 are preferably chosen having resistances such that the ratio of the value of the resistance 20 to the value of the resistance of resistor 26 is substantially equal to the ratio of the value of the resistor 23 to the value of the resistance of the resistor 25. The values of the resistances of resistors 25 and 26 may be chosen in order to optimise temporal behaviour of the detector reading circuit means. By choosing the resistor 23 having a resistance substantially equal to the resistance 20, it is achieved that the current feedback operational amplifier is balanced, so that said amplifier generates no output signal when zero voltage is supplied to the resistor 25. An integration capacitor 27 is connected to the non-inverting input port 24. For discharging the integration capacitor 27 a dual gate field-effect transistor (FET) 28 is provided; Thus forming a resetable integration means, wherein the FET contributes a controllable discharging means. To a first gate 29 of the dual gate FET a constant potential and high-frequency decoupling is applied for reducing cross-talk through the parasitic capacitance between a second gate 30 of the dual gate FET and a drain 31 of the dual gate FET. The constant potential is provided by a DC-voltage supply 32. High-frequency decoupling is performed by a high-frequency decoupling means 33, notably a capacitor having a suitable capacitance. Depending on a signal being generated by the x-ray detector, a trigger circuit 34 supplies a voltage to the second gate 30. Thus, whenever a signal is supplied by the x-ray detector, integration of the signal is performed by charge accumulation on the integration capacitor 27 and hence the trigger circuit form a signalling means. The source 35 of the dual gate FET is connected to an, optionally further, stable reference potential for achieving stability of the operation of the dual gate FET, notably in the embodiment shown in FIG. 2 the source 35 of the dual gate FET is connected to ground. The integration capacitor 27 is also connected to an, optionally still further stable reference potential, notably in the embodiment shown in FIG. 2 the integration capacitor is connected to ground for enabling the integration capacitor to be discharged to zero voltage when the dual gate FET is switched to its conductive state. The output of the detector reading circuit means 18 is supplied to a further output processing circuit 36.

We claim:

1. An x-ray analysis apparatus comprising an x-ray source, a sample holder, and an x-ray detector with detector reading circuit means which comprises:
   resetable integration means comprising a high-bandwidth amplifying means having an input port coupled to one end of a parallel combination of an integration capacitor and controllable means for discharging the integration capacitor; and
   circuit means for supplying a control signal for activating said discharging means, said circuit means including high-frequency decoupling means for shielding the integration capacitor from an unwanted high-frequency component in said control signal.

2. An x-ray analysis apparatus as claimed in claim 1, wherein said controllable discharging means comprises a field-effect transistor and said circuit means is arranged to supply said control signal to a gate of said field-effect transistor.

3. An x-ray examination apparatus as claimed in claim 2, wherein said transistor is a dual gate field-effect transistor having first and second gates, a source and a drain, said gate to which said circuit means is arranged to supply said control signal is said first gate, and further comprising a DV voltage supply for applying a voltage to said second gate for reducing cross-talk between said first gate and said drain.

4. An x-ray analysis apparatus as claimed in claim 1, wherein said circuit means comprises a trigger circuit for supplying said control signal to said controllable discharging means in dependence on a signal being generated by the x-ray detector.

5. An x-ray analysis apparatus as claimed in claim 1, wherein said high-bandwidth amplifying means comprises a high-frequency operational amplifier having an inverting input port, a non-inverting input port, and an output port, the input port to which said one end of the parallel combination of said integration capacitor and said discharging means is coupled being said non-inverting input port, and the other end of said parallel combination being coupled to a constant reference potential.

6. An x-ray analysis apparatus as claimed in claim 5, wherein said detection circuit reading means comprises offset adjustment means for adjusting a potential difference between said non-inverting input port and said inverting input port.

7. An x-ray analysis apparatus comprising an x-ray source, a sample holder, and an x-ray detector with detector reading circuit means which comprises:
   a high-frequency operational amplifier having an inverting input port, a non-inverting input port, and an output port;
   a parallel combination of an integration capacitor and controllable means for discharging the integration capacitor, said parallel combination being coupled to one end to said non-inverting input port and at the other end to a constant reference potential; and
   circuit means for supplying a control signal for activating said discharging means.

8. An x-ray analysis apparatus as claimed in claim 7, wherein said circuit means further comprises high-frequency decoupling means for shielding the integration capacitor from an unwanted high-frequency component in said control signal.

9. An x-ray analysis apparatus as claimed in claim 7, wherein said controllable discharging means comprises a field-effect transistor and said circuit means is arranged to supply said control signal to a gate of said field-effect transistor.

10. An x-ray examination apparatus as claimed in claim 7, wherein said transistor is a dual gate field-effect transistor having first and second gates, a source and a drain, said gate to which said circuit means is arranged to supply said control signal is said first gate, and further comprising a DC voltage supply for applying a voltage to said second gate for reducing cross-talk between said first gate and said drain.

11. An x-ray analysis apparatus as claimed in claim 7, further wherein said circuit means comprises a trigger circuit for supplying said control signal to said controllable discharging means in dependence on a signal being generated by the x-ray detector.

12. An x-ray analysis apparatus as claimed in claim 7, wherein said detection circuit reading means comprises offset adjustment means for adjusting a potential difference between said non-inverting input port and said inverting input port.

13. A detector reading means suitable for an x-ray analysis apparatus, said detector reading circuit means comprising:
- a high-frequency operational amplifier having an inverting input port, a non-inverting input port, and an output port;
- a parallel combination of an integration capacitor and controllable means for discharging the integration capacitor, said parallel combination being coupled at one end to said non-inverting input port and at the other end to a reference potential; and
- circuit means for supplying a control signal for activating said discharging means.

* * * * *